(12) United States Patent
Hasuka et al.

(10) Patent No.: US 7,083,017 B2
(45) Date of Patent: Aug. 1, 2006

(54) FUEL CELL VEHICLE

(75) Inventors: Yoshinobu Hasuka, Utsunomiya (JP); Hibiki Saeki, Utsunomiya (JP); Satoshi Aoyagi, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 10/723,733

(22) Filed: Nov. 25, 2003

(65) Prior Publication Data
US 2004/0144579 A1    Jul. 29, 2004

(30) Foreign Application Priority Data
Nov. 28, 2002  (JP)  ............................. 2002-345752

(51) Int. Cl.
    *H01M 8/04*    (2006.01)
(52) U.S. Cl. ................... 180/65.1; 180/65.2; 180/65.3; 429/22.23; 429/13
(58) Field of Classification Search ...... 180/65.1–65.3; 429/22, 23, 13
    See application file for complete search history.

(56) References Cited

U.S. PATENT DOCUMENTS

| | | | |
|---|---|---|---|
| 5,290,641 A | 3/1994 | Harashima | |
| 6,815,100 B1 | 11/2004 | Aoyagi et al. | |
| 2001/0051291 A1 | 12/2001 | Aoyagi et al. | |
| 2002/0114986 A1* | 8/2002 | Aoyagi et al. | ................. 429/23 |
| 2003/0008185 A1* | 1/2003 | Sugino et al. | ................. 429/13 |
| 2004/0172206 A1* | 9/2004 | Saeki et al. | .................... 702/60 |
| 2004/0185317 A1 | 9/2004 | Aoyagi et al. | |
| 2004/0204874 A1* | 10/2004 | Hasuka et al. | ................. 702/60 |

FOREIGN PATENT DOCUMENTS

| | | |
|---|---|---|
| DE | 101 09 151 A1 | 9/2002 |
| EP | 1 207 578 A2 | 5/2002 |
| JP | 10-271706 | 10/1998 |
| JP | 2001-357865 | 12/2001 |
| JP | 2003-187816 | 7/2003 |
| JP | 2003-324801 | * 11/2003 |

OTHER PUBLICATIONS

Office Action issued Mar. 14, 2006 in corresponding JP 2002-345752.

* cited by examiner

*Primary Examiner*—J. Allen Shriver
*Assistant Examiner*—Cynthia F. Collado
(74) *Attorney, Agent, or Firm*—Lahive & Cockfield, LLP; Anthony A. Laurentano, Esq.

(57) ABSTRACT

A fuel cell vehicle can reduce the starting time while protecting the fuel cell. When starting the vehicle, a control apparatus execute an idle charging an output voltage (estimated output voltage) of the fuel cell immediately after the vehicle commences movement, in the condition where, while in the idle charging state at the time of starting the fuel cell vehicle, e.g., the state wherein generation of power by the fuel cell continues, and the value of the output current extracted from the fuel cell is being restricted to an appropriate value by a current and voltage controller, a capacitor is being charged with the restricted current. Then, the control apparatus, when detecting that the increased terminal voltage of the capacitor due to charging from the fuel cell has gone above the estimated output voltage, outputs to an output controller a control command to start power supply to a propulsion motor.

2 Claims, 4 Drawing Sheets

FUEL CELL VEHICLE

BACKGROUND OF THE INVENTION

Priority is claimed to Japanese application No. 2002-345752, filed Nov. 28, 2003, which is incorporated herein by reference.

1. Field of the Invention

The present invention relates to a control apparatus for a fuel cell vehicle.

2. Description of the Related Art

A solid polymer membrane fuel cell conventionally comprises, for example, cells formed by sandwiching a solid polymer electrolyte membrane between a fuel electrode (anode) and an oxygen electrode (cathode), with a plurality of such cells arranged in a stack. Hydrogen is supplied to the fuel electrode as fuel, and air is supplied to the oxygen electrode as oxidant, and hydrogen ions generated by a catalytic reaction at the fuel electrode pass through the solid polymer electrolyte membrane and migrate to the oxygen electrode, causing an electrochemical reaction with the oxygen at the oxygen electrode, and generating electricity As a fuel cell vehicle provided with such a fuel cell as a source of motive power, heretofore there is known a fuel cell vehicle, fitted with a capacitor comprising for example an electric double layer capacitor or an electrolytic capacitor or the like, and constructed so as to store the electrical energy generated by the fuel cell, and transfer electrical energy to the propulsion motor (see, for example, Japanese Unexamined Patent Application, First Publication No. 2001-357865).

In such a fuel cell vehicle, the capacitor is connected in parallel to the fuel cell via an output controller which controls the output current and output voltage of the fuel cell, and output control action such as chopping action or the like of the output controller which comprises, for example, a chopper type power conversion circuit, is controlled corresponding to the state of, for example, the fuel cell vehicle, the fuel cell, or the capacitor.

[Patent document 1] Japanese Unexamined Patent Application, First Publication No. 2001-357865

In practice, when starting a fuel cell vehicle according to the example of the aforementioned conventional technology, an air compressor or the like which supplies reactant gas to the fuel cell is driven by power supplied from the capacitor. Therefore, due to the fuel cell being connected directly to the capacitor for which the terminal voltage has dropped due to discharge, an excessive current flows abruptly from the fuel cell to the capacitor, and the terminal voltage of the fuel cell drops excessively. In order to prevent this, the current value of the output current extracted from the fuel cell is restricted by the output controller to a value less than a predetermined value, until the voltage difference between the fuel cell terminal voltage and the capacitor terminal voltage becomes less than a predetermined voltage difference including zero. Then the capacitor is charged with the output current from the fuel cell restricted to less than the predetermined value, and after the terminal voltage difference of the terminal voltages of the fuel cell and the capacitor becomes less than the predetermined value the restriction on output current is removed. In other words, the fuel cell and the capacitor are directly connected, after which drive power is supplied to the propulsion motor.

However, the capacitor for which the terminal voltage has dropped due to the discharge for starting the fuel cell is charged with power generated by the fuel cell, and movement of the vehicle is prevented until the voltage difference between the capacitor terminal voltage and the fuel cell terminal voltage is less than the predetermined voltage difference. Therefore, it is desirable to be able to begin movement of the fuel cell vehicle earlier.

SUMMARY OF THE INVENTION

The present invention takes into consideration the above situation, with the object of providing a control apparatus for a fuel cell vehicle capable of reducing the time required to begin operation of the fuel cell vehicle, while maintaining protection of the fuel cell, when starting the fuel cell vehicle.

To solve the aforementioned problems and achieve the related object, a fuel cell vehicle according to a first aspect of the present invention is a control apparatus for a fuel cell vehicle provided with; a propulsion motor capable of driving the vehicle, a fuel cell supplied with a reactant gas to generate power from an electrochemical reaction, a capacitor charged with generated power of said fuel cell and regenerative electric power of said propulsion motor, and a reactant gas supply device (for example the S/C output controller 17, the air compressor 18, the hydrogen tank 19a, the hydrogen supply valve 19b, and the control apparatus 20 in the embodiment) which supplies said reactant gas to said fuel cell; characterized in comprising: a control apparatus (for example, step S01 in the embodiment) which drives said reactant gas supply device with power supplied from said capacitor to start power generation of said fuel cell, when said fuel cell vehicle is started, wherein said control apparatus estimating an output voltage of said fuel cell, said voltage being reduced when a current is supplied to said propulsion motor from said fuel cell; a capacitor charging device (for example, step S03 in the embodiment) which charges said capacitor by the power generated by said fuel cell when a terminal voltage has dropped due to supply of power to said reactant gas supply device; a terminal voltage detecting device (for example, the capacitor voltage sensor 24 in the embodiment) which detects the terminal voltage of said capacitor; and a propulsion motor drive permitting device (for example, step S05 and step S06 in the embodiment) which permits power supply from said fuel cell to said propulsion motor when said capacitor terminal voltage is detected to be equal to or greater than the estimated output voltage estimated by said control aparatus.

According to the fuel cell vehicle of the above configuration, when the fuel cell vehicle is started, the power generation start device first operates the reactant gas supply device by power supply from the capacitor, so that the reactant gas is supplied to the fuel cell, and generation of power commences. Here, the control apparatus estimates the output voltage of fuel the cell for when, in a condition with for example the current value of the output current of the fuel cell restricted to less than the predetermined value including zero, power is supplied to the propulsion motor from the fuel cell corresponding for example to operation of the accelerator by the operator, and the fuel cell vehicle moves. In other words, the control apparatus estimates, the amount of power flowing to the propulsion motor, and the drop in output voltage, based on the output voltage of the fuel cell detected prior to commencement of the flow of power to the propulsion motor from the fuel cell, and the amount of accelerator operation by the operator.

Then in a condition where the capacitor for which the terminal voltage has dropped due to discharge when the fuel cell is started, is charged by the capacitor charging device, for example by an appropriately restricted output current from the fuel cell, at the point in time when the capacitor terminal voltage reaches the estimated output voltage, the propulsion motor drive permitting device permits the flow of power to the propulsion motor.

As a result, the fuel cell vehicle is able to commence movement earlier, compared to the case where the capacitor is charged for example by the restricted output current of the fuel cell, and the supply of power to the propulsion motor is not permitted until after the voltage difference between the fuel cell output voltage and the capacitor terminal voltage has become less than the predetermined value, in other words, until after the terminal voltage of the capacitor has reached the output voltage of the fuel cell.

Furthermore, a fuel cell vehicle according to a second aspect of the present invention, is characterized in that the control apparatus estimates said estimated output voltage based on a predetermined accelerator opening related to an accelerator operation amount.

According to the fuel cell vehicle of the above configuration, the control apparatus estimates the estimated output voltage of the fuel cell following commencement of the flow of power to the propulsion motor, based on, for example, the accelerator operation amount by the operator when the fuel cell vehicle was last started, a history of the accelerator operation amount by the operator for when the fuel cell vehicle was started prior to the last start, or a predetermined accelerator operation amount (for example, the accelerator operation amount corresponding to an accelerator opening of 100% or 50%, with 100% as fully open).

As a result, at least the output required to run the fuel cell vehicle can be ensured, and it is possible to set so that the fuel cell and capacitor can be coupled directly after the fuel cell vehicle commences movement, in other words so that the voltage difference between the detected output voltage of the fuel cell and the capacitor terminal voltage becomes less than the predetermined voltage difference.

DETAILED DESCRIPTION OF THE INVENTION

The following describes a control apparatus for a fuel cell vehicle according to an embodiment of the present invention, with reference to the appended drawings.

Figure 1:
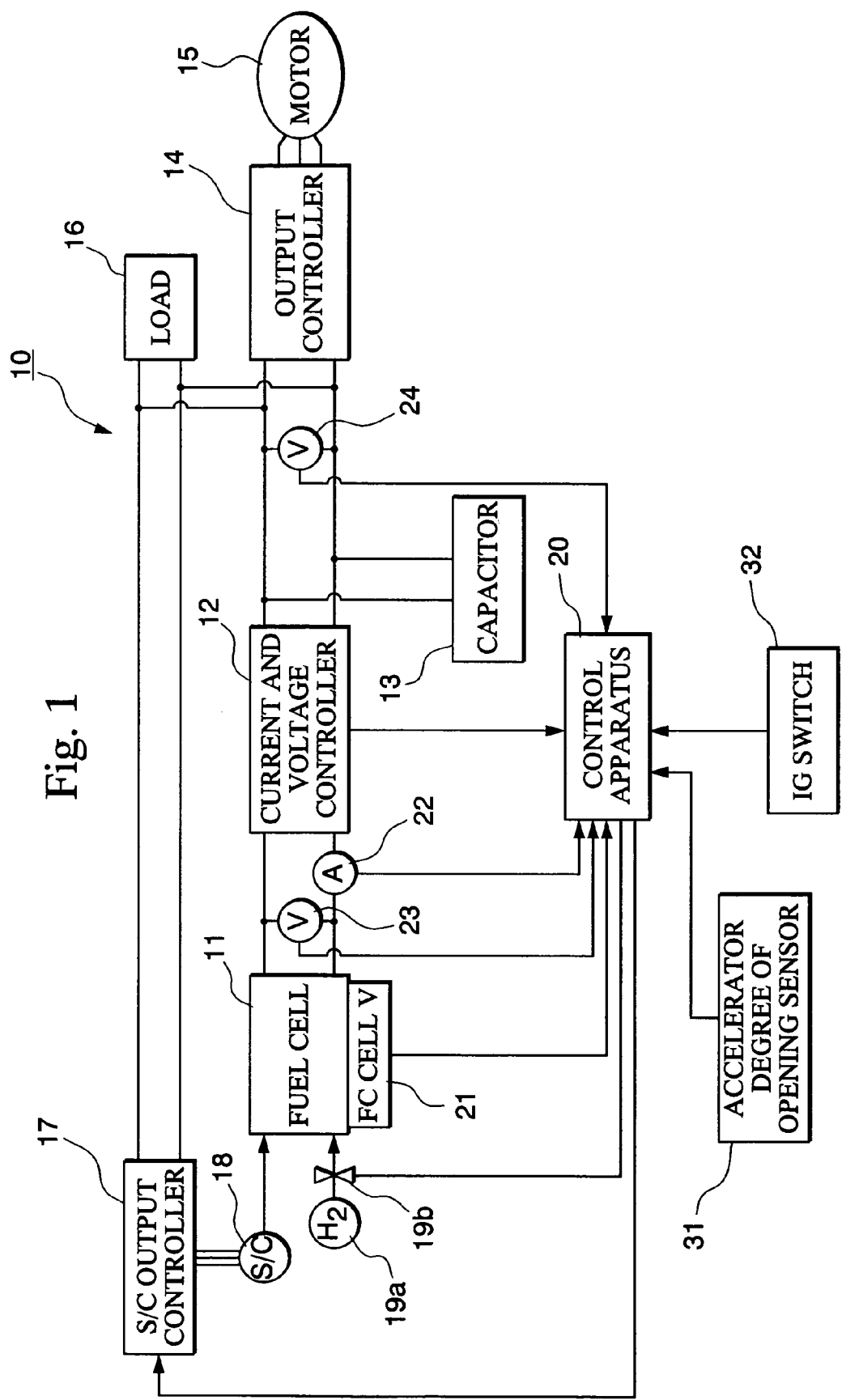
FIG. 1 is a block diagram of a control apparatus for a fuel cell vehicle according to an embodiment of the present invention.

A control apparatus 10 for the fuel cell vehicle according to the present embodiment comprises for example as shown in FIG. 1; a fuel cell 11, a current and voltage controller 12, a capacitor 13, an output controller 14, a propulsion motor 15, a load 16, an S/C output controller 17, an air compressor (S/C) 18, a hydrogen tank 19$a$ and hydrogen supply valve 19$b$, a control apparatus 20, a fuel cell unit voltage sensor 21, an output current sensor 22, an output voltage sensor 23, a capacitor voltage sensor 24, a throttle opening sensor 31, and an IG switch 32.

The fuel cell 11 comprises a stack of fuel cell units made up with an electrolyte electrode structure holding a solid polymer electrolyte membrane formed from a positive ion exchange membrane or the like sandwiched between a fuel electrode (anode) formed from an anode catalyst and gas diffusion layer, and an oxygen electrode (cathode) formed from a cathode catalyst and gas diffusion layer, which is further sandwiched between a pair of separators.

The anode of the fuel cell 11 is supplied with fuel gas (reactant gas) comprising hydrogen, from the high-pressure hydrogen tank 19$a$ via the hydrogen supply valve 19$b$. Hydrogen ionized by the catalytic reaction on the anode catalyst of the anode migrates to the cathode via an appropriately humidified solid polymer electrolyte membrane, and electrons released in association with this migration are extracted to an external circuit and used as DC electrical energy. The cathode is supplied with, for example, air as an oxidizing gas (reactant gas) containing oxygen, by the air compressor (S/C) 18, and the hydrogen ions, electrons, and oxygen react at the cathode to form water.

The generated current (output current) extracted from the fuel cell 11 is input to the current and voltage controller 12. The current and voltage controller 12 is connected to a capacitor 13 comprising, for example, multiple capacitor cells formed from electric double layer capacitors or electrolytic capacitors or the like connected mutually in series.

The fuel cell 11, the current and voltage controller 12, and the capacitor 13 are connected in parallel to the propulsion motor 15 via the output controller 14, the load 16 comprising various auxiliary equipment, for example, a cooling device for the fuel cell 11 and the capacitor 13 (not shown in drawings) and an air conditioner (not shown in drawings), and the air compressor (S/C) 18 via the S/C output controller 17.

The current and voltage controller 12 comprises, for example, a chopper type power conversion circuit wherein the value of the output current extracted from the fuel cell 11 is controlled by the chopping action of the chopper type power conversion circuit, in other words, by the on/off action of a switching device provided in the chopper type power conversion circuit. This chopping action is controlled in accordance with a duty ratio, in other words, on/off ratio, of the control pulse input from the control apparatus 20.

For example, when the extraction of output current from the fuel cell 11 is prevented, setting the duty ratio of the control pulse input from the control apparatus 20 to 0% results in the switching device provided in the chopper type power conversion circuit being held in the off condition, and the fuel cell 11 and the capacitor 13 are electrically disconnected. On the other hand, setting the duty ratio of the control pulse to 100% results in the switching device being held in the on condition, in effect directly connecting the fuel cell 11 and the capacitor 13. Thus the output voltage of the fuel cell 11 and the capacitor 13 terminal voltage assume the same value.

Furthermore, when the duty ratio of the control pulse is set appropriately between 0% and 100%, the current and voltage controller 12 restricts the output current of the fuel cell 11, in other words, the primary current, as appropriate in accordance the duty ratio of the control pulse, and the restricted current thus obtained is output as the secondary current.

The output controller 14 is provided with, for example, a PWM inverter which uses pulse width modulation (PWM), and controls the drive and regenerative action of the propulsion motor 15 corresponding to control commands output from the control apparatus 20. For example, when the propulsion motor 15 is driven, DC power output from the current and voltage controller 12 and the capacitor 13 is converted to three-phase AC power based on the torque command input from the control apparatus 20, and supplied to the propulsion motor 15. On the other hand, during regeneration with the propulsion motor 15, the three-phase AC power output from the propulsion motor 15 is converted to DC power and supplied to the capacitor 13 to charge the capacitor 13.

The propulsion motor 15 is, for example, a permanent magnet type three-phase AC synchronous motor using a permanent magnet as a field magnet, and is driven and controlled with three-phase AC power supplied from the output controller 14. Additionally, when drive power is transmitted to the propulsion motor 15 from the drive wheels during deceleration of the vehicle, the propulsion motor 15 functions as a generator, producing so called regenerative braking power, recovering the kinetic energy of the vehicle in the form of electrical energy.

Moreover, the air compressor 18 takes, for example, air from outside the vehicle, compresses it, and supplies this air to the cathode of the fuel cell 11 as reactant gas.

The speed of rotation of the motor (not shown in drawings) driving this air compressor 18 is controlled by the S/C output controller 17, provided with, for example, a PWM inverter which uses pulse width modulation (PWM), based on control commands output from the control apparatus 20.

The control apparatus 20 outputs the command value for the flow of the reactant gas supplied from the air compressor 18 to the fuel cell 11, and the command value for the opening of the hydrogen supply valve 19b, based on, for example, the operating state of the vehicle, the concentration of hydrogen in the reactant gas supplied to the anode of the fuel cell 11, the concentration of hydrogen in the gas discharged from the anode of the fuel cell 11, and the state of power generation of the fuel cell 11, for example, the terminal voltage of each of the multiple fuel cell units, and the output current extracted from the fuel cell 11, to thereby control the state of power generation of the fuel cell 11.

Furthermore, the control apparatus 20 outputs control pulses to control the power conversion operation of the current and voltage controller 12, based on a power generation command for the fuel cell 11, to thereby control the value of the current output from the fuel cell 11.

Moreover, the control apparatus 20 controls the power conversion operation of the PWM inverter provided in the output controller 14, and when, for example, the propulsion motor 15 is driven, computes a torque command based on a signal for the throttle opening associated with the amount of pressing of the accelerator pedal by the driver. The control apparatus 20 then inputs this torque command to the output controller 14. As a result, a pulse width modulation signal corresponding to the torque command is input to the PWM inverter, and various phase currents required to produce the requested torque are output to each phase of the propulsion motor 15.

Furthermore, the control apparatus 20 controls the regenerative operation of the propulsion motor 15 based on the state of the capacitor 13, for example, the temperature of the capacitor 13, the total voltage being the sum of the capacitor unit voltages of multiple capacitor units, in other words, the detected value of the terminal voltage of the capacitor 13, or the like.

Therefore to the control apparatus 20 is input for example: a detection signal output from the fuel cell unit voltage sensor 21 which detects the terminal voltage (fuel cell unit voltage) of the multiple fuel cell units comprising the fuel cell 11; a detection signal output from the output current sensor 22 which detects the value of the output current extracted from the fuel cell 11; a detection signal output from the output voltage sensor 23 which detects the output voltage of the fuel cell 11; a detection signal output from the capacitor voltage sensor 24 which detects the terminal voltage of the capacitor 13; a detection signal output from the capacitor temperature sensor (not shown in drawings) which detects the temperature of the capacitor 13; a detection signal output from the throttle opening sensor 31; and a signal output from the IG switch 32 which instructs commencement of operation of the vehicle.

Moreover, as described below, the control apparatus 20 estimates the output voltage (estimated output voltage) of the fuel cell 11 for immediately after the vehicle commences movement, in the condition where, while in the idle charging state at the time of starting the fuel cell vehicle, in other words, the state wherein generation of power by the fuel cell 11 continues, the value of the output current extracted from the fuel cell 11 is being restricted to an appropriate value by the current and voltage controller 12, and the capacitor 13 is being charged with the restricted current. Then, the control apparatus 20, at the point in time when detected that the increased terminal voltage of the capacitor 13 due to charging from the fuel cell 11 has gone above the estimated output voltage, outputs to the output controller 14 a control command instructing commencement of power supply to the propulsion motor 15.

The control apparatus 10 for the fuel cell vehicle according to the present embodiment has the aforementioned configuration. Next is a description of the operation of the control apparatus 10 for the fuel cell vehicle, in particular, the operation when starting the fuel cell vehicle, with reference to the appended drawings.

Figure 2:
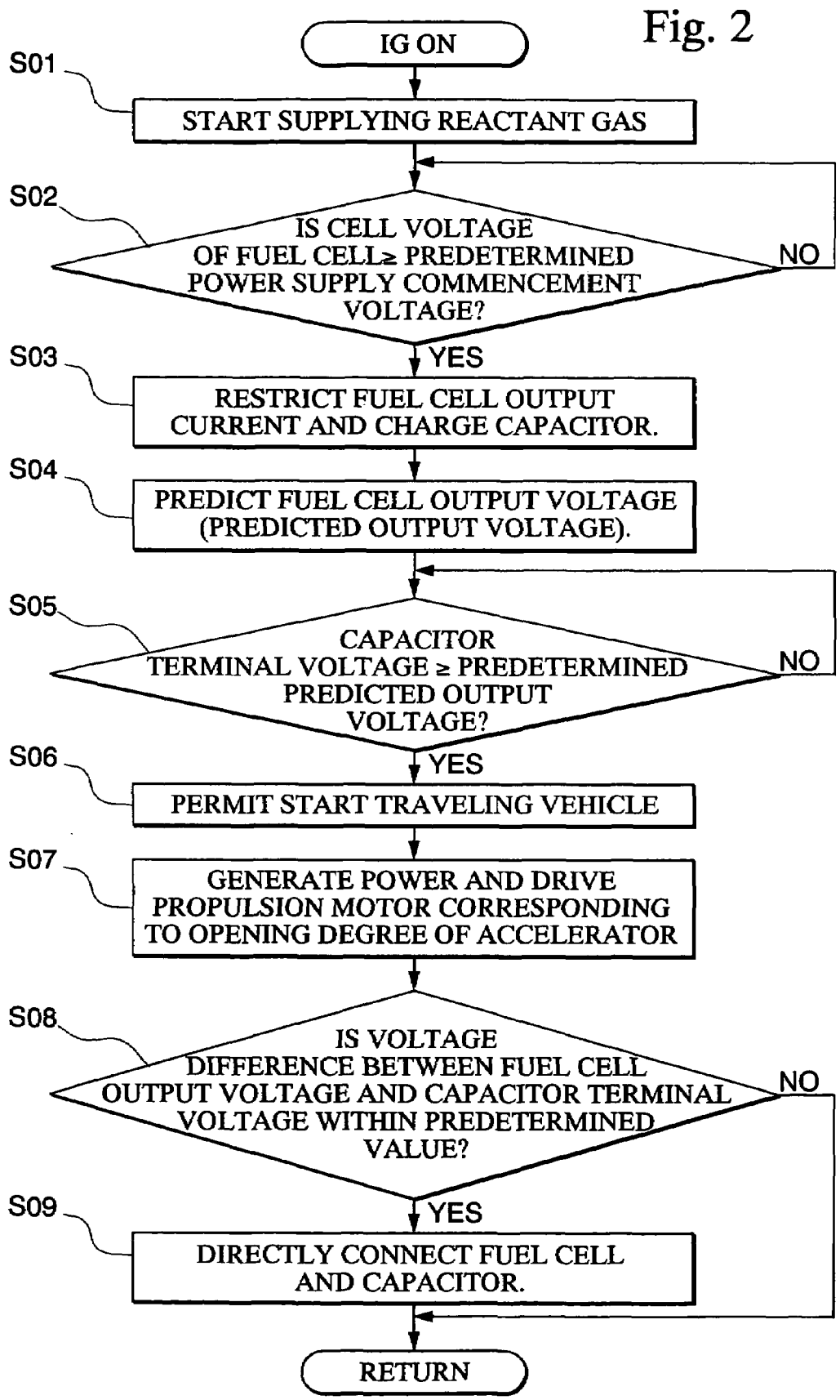
FIG. 2 is a flow chart showing operation of the control apparatus for a fuel cell vehicle shown in FIG. 1.

Firstly, when the driver sets the IG switch 32 instructing starting of the vehicle, to the on state, then for example in step S01 shown in FIG. 2, the supply of reactant gas to the fuel cell 11 is commenced. Here, for example, the hydrogen supply valve 19b is set to the open state so that hydrogen is supplied to the anode of the fuel cell 11 from the hydrogen tank 19a. Moreover, the air compressor 18 is driven with power supplied from the capacitor 13, to thereby supply air including oxygen to the cathode of the fuel cell 11. Furthermore, here, the duty ratio of the control pulse input to the current and voltage controller 12 is set at 0%, so that the fuel cell 11 and the capacitor 13 are electrically disconnected.

Figure 3A:
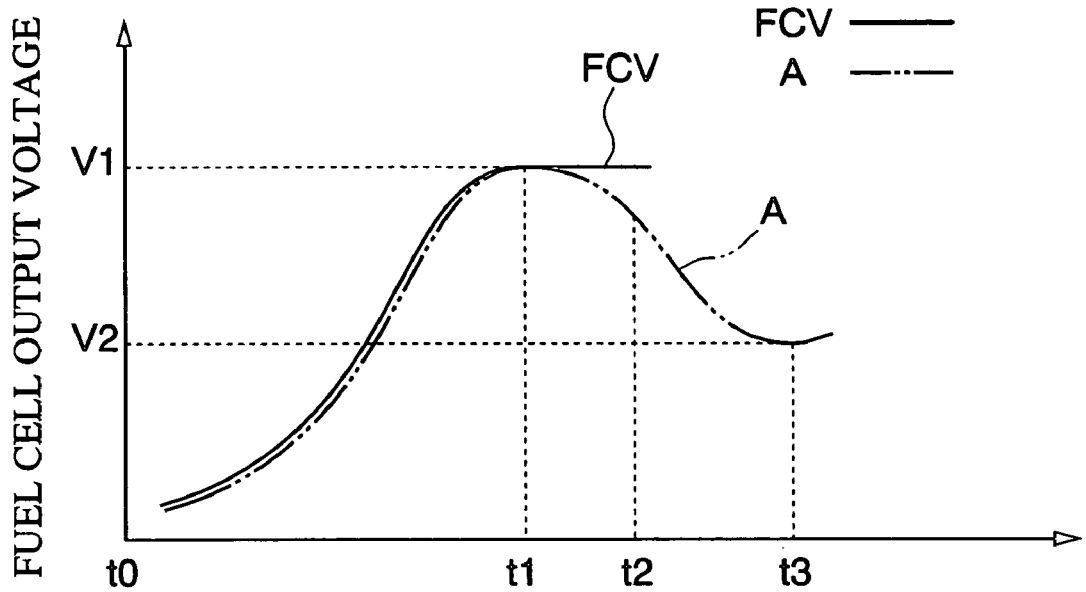
FIG. 3($a$) is a graph showing an example of changes over time in output voltage of the fuel cell when starting the fuel cell vehicle, and FIG. 3($b$) is a graph showing an example of changes over time in terminal voltage of the capacitor when starting the fuel cell vehicle.
Figure 3B:
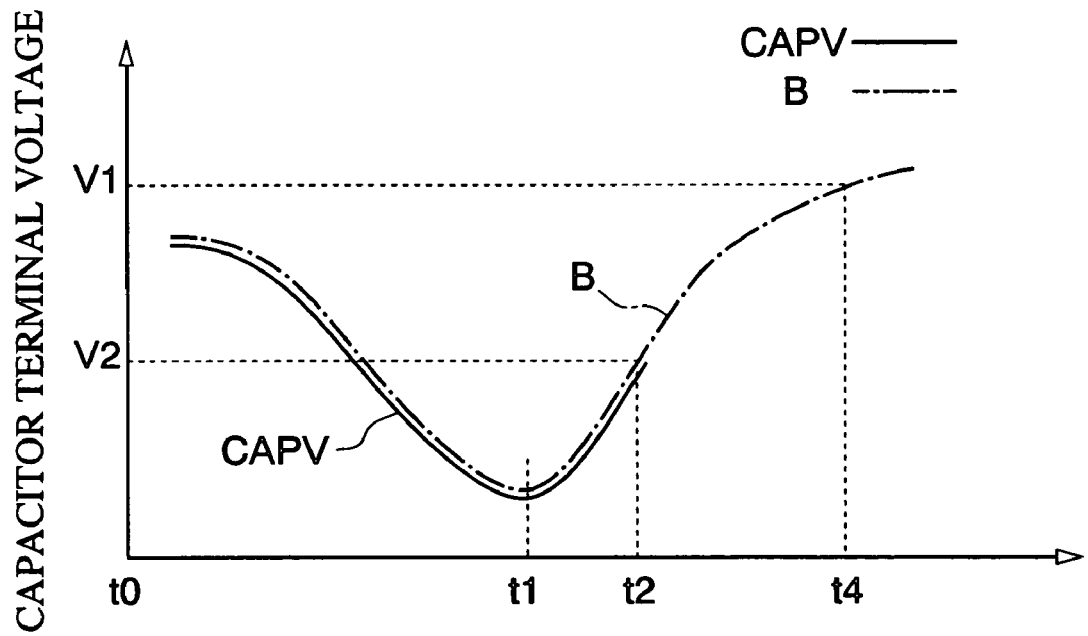

As a result, as shown for example between time t0 and time t1 in FIG. 3(a), the output voltage of the fuel cell 11 (for example, the solid line FCV in FIG. 3(a)) changes in an increasing trend due to power generation, and the terminal voltage of the capacitor 13 (for example, the solid line CAPV in FIG. 3(b)) changes in a decreasing trend due to the supply of power to the S/C output controller 17 as shown in FIG. 3(b).

Next, in step S02, it is determined whether or not the terminal voltage of the multiple fuel cell units constituting the fuel cell 11 is greater than or equal to a predetermined power supply start voltage.

If the determination result is NO, the flow returns to step S02 and the electrically disconnected state of the fuel cell 11 and the capacitor 13 continues.

On the other hand, if the determination result is YES, the flow proceeds to step S03.

Figure 4:
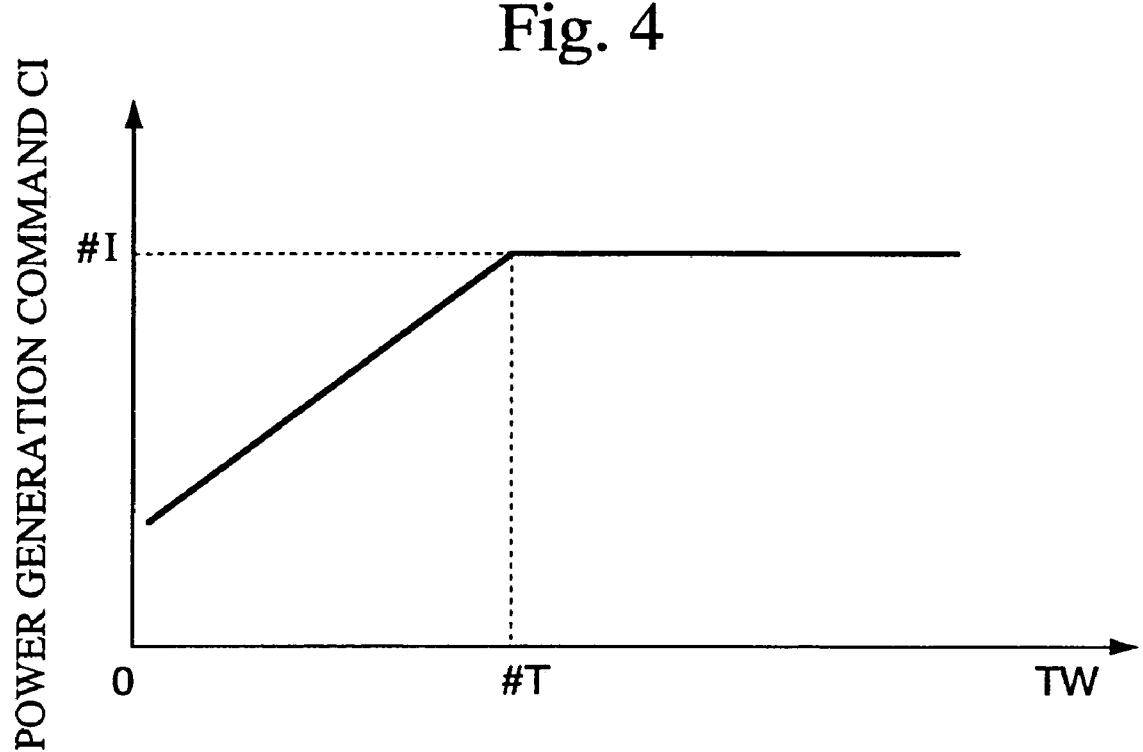
FIG. 4 is a graph showing an example of changes in the current command corresponding to the temperature of the coolant which cools the fuel cell.

In step S03, the duty ratio of the control pulse input to the current and voltage controller 12 is set appropriately to between 0% and 100%, the output current of the fuel cell 11, being the primary current, is restricted appropriately corresponding to the duty ratio of this control pulse, and the restricted current is supplied to the capacitor 13 side as the secondary current. Here, the power generation command for the fuel cell 11, in other words, the current command CI for the output current of the fuel cell 11, is set such that, for example, as shown in FIG. 4, it changes corresponding to the temperature TW of the coolant for cooling the fuel cell 11, and such that, for example, when the temperature TW of the coolant increases to a predetermined temperature #T, the current command CI increases to a predetermined upper limit #I.

As a result, as shown for example between time t1 and time t2 in FIG. 3(b), the terminal voltage of the capacitor 13 (for example, the solid line CAPV in FIG. 3(b)) changes in an increasing trend due to charging from the fuel cell 11.

Next, in step S04, a estimated value (for example, the voltage V2 at time t3 in FIG. 3(a)) for the output voltage of the fuel cell 11 (for example, the two dot chain line A in FIG. 3(a)), in other words, the estimated output voltage for the fuel cell 11, is estimated for when the propulsion motor 15 is driven with power supplied from the fuel cell 11 and the vehicle commences movement.

This estimated output voltage is estimated based on the following three parameters. That is: (a) the amount of current supplied to the propulsion motor 15 as determined from the setting for accelerator operation amount set based on; for example the accelerator operation amount by the operator when the vehicle was last started, for example a history of the accelerator operation amount by the operator for when the vehicle was started prior to the last start, or a predetermined accelerator operation amount (for example, the accelerator operation amount corresponding to an accelerator opening of 100% or 50%, with 100% as fully open); (b) the output voltage of the fuel cell 11 detected prior to commencing the supply of power to the propulsion motor 15 (for example, the voltage V1 at the time t1 shown in FIG. 3(a), with V1>V2); and (c) the drop in the output voltage obtained from the predetermined characteristics (IV characteristics) of the output current and output voltage of the fuel cell 11. Here, the IV characteristics of the fuel cell 11 are known to be such that the generated voltage decreases when the generated current is increased, and it is possible to estimate the drop in the voltage generated by the fuel cell 11 corresponding to the current supplied to the electrical load including the propulsion motor 15.

Next, in step S05, it is determined whether or not the terminal voltage of the capacitor 13 is greater than or equal to the predetermined estimated output voltage.

If the determination result is NO, the flow returns to step S05 and charging of the capacitor 13 continues with the output current of the fuel cell 11 restricted.

On the other hand, if the determination result is YES, for example, as shown by time t2 as in FIG. 3(b) where the terminal voltage of the capacitor 13 (for example, the solid line CAPV in FIG. 3(b)) reaches the predetermined estimated output voltage (for example, voltage V2) due to charging, then the flow proceeds to step S06.

In step S06, the supply of drive power for the propulsion motor 15 is commenced, in other words, the vehicle is permitted to commence movement.

Then, in step S07, the power generation command corresponding to, for example, the throttle opening associated with the accelerator movement by the operator, is output to the current and voltage controller 12 and S/C output controller 17, and the torque command corresponding to the throttle opening or the like, is output to the output controller 14, to thereby drive the propulsion motor 15 with power supplied from the fuel cell 11.

Then, in step S08, it is determined whether or not the deviation between the output voltage of the fuel cell 11 and the terminal voltage of the capacitor 13 is less than a predetermined deviation.

If the determination result is NO, the sequence of processing ends.

On the other hand, if the determination result is YES, the flow proceeds to step S09.

In step S09, the duty ratio of the control pulse input to the current and voltage controller 12 is set to 100%, the fuel cell 11 and capacitor 13 are set to the directly connected state, and the sequence of processing ends.

As described above, according to the control apparatus 10 for a fuel cell vehicle of the present embodiment, it is possible to predict the voltage of the fuel cell 11 (estimated output voltage) which drops due to the supply of power to the propulsion motor 15, and supply drive power to the propulsion motor 15 at the point in time when the terminal voltage of the capacitor 13 reaches the estimated output voltage (for example, time t2 in FIG. 3(b)), to thereby rapidly commence movement of the fuel cell vehicle.

In other words, the fuel cell vehicle is able to commence movement earlier compared to the case where supply of power to the propulsion motor 15 is commenced at the point in time (for example, time t4 in FIG. 3(b), with t4>t2), when the terminal voltage (for example, the single dot chain line B in FIG. 3(b)) of the capacitor 13 charged with the regulated fuel cell 11 output current, reaches a value equivalent to the output voltage of the fuel cell 11 (for example, voltage V1).

Moreover, compared to the case where the capacitor 13 is charged while, for example, the supply of power from the fuel cell 11 to the propulsion motor 15 is prevented, and the capacitor 13 and the fuel cell 11 are set to the directly connected state, after the terminal voltage of the capacitor 13 reaches the output voltage of the fuel cell 11, the capacitor 13 and the fuel cell 11 can be set to the directly connected state earlier, and the fuel cell vehicle operated appropriately.

In the present embodiment described above, the estimated output voltage is estimated based on, the set value for accelerator operation amount, the drop in the output voltage obtained from the IV characteristics, and the output voltage of the fuel cell 11 detected prior to the commencement of power supply to the propulsion motor 15. However, this is not limiting, and the estimated output voltage may also be estimated based on a predetermined output voltage rather than for example the output value of the output voltage of the fuel cell 11 detected prior to the commencement of power supply.

As described above, according to the control apparatus for a fuel cell vehicle of the first aspect of the present invention, compared to the case where power supply to the propulsion motor 15 is commenced after for example the terminal voltage of the capacitor reaches the output voltage of the fuel cell 11, the fuel cell vehicle is able to commence movement earlier.

Moreover according to the control apparatus for a fuel cell vehicle of the second aspect of the present invention, it is possible to ensure at least the output required to run the fuel cell vehicle, and to set so that the fuel cell and the capacitor become directly coupled after commencement of movement of the fuel cell vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

The invention claimed is:

1. A fuel cell vehicle, comprising:
   a propulsion motor capable of driving the vehicle;
   a fuel cell supplied with a reactant gas to generate power from an electrochemical reaction;
   a capacitor charged with generated power of said fuel cell and regenerative electric power of said propulsion motor,
   a reactant gas supply device which supplies said reactant gas to said fuel cell;
   a control apparatus which drives said reactant gas supply device with current supplied from said capacitor to start power generation of said fuel cell, said control apparatus estimating an output voltage of said fuel cell, said voltage being reduced when a current is supplied to said propulsion motor from said fuel cell;
   a capacitor charging device which charges said capacitor with current generated by said fuel cell when a terminal voltage has dropped due to supply of current to said reactant gas supply device by said control apparatus;
   a terminal capacitor voltage detecting device which detects the terminal voltage of said capacitor; and
   a propulsion motor drive permitting device which permits power supply from said fuel cell to said propulsion motor when said capacitor terminal voltage is equal to or greater than an estimated output voltage estimated by said control apparatus.

2. A fuel cell vehicle according to claim 1, wherein said control apparatus estimates said estimated output voltage based on a predetermined accelerator opening related to an accelerator operation amount.

* * * * *